A. KNAPEN.
MEANS FOR DRYING STRUCTURAL PARTS.
APPLICATION FILED APR. 7, 1908.
915,969.  Patented Mar. 23, 1909.
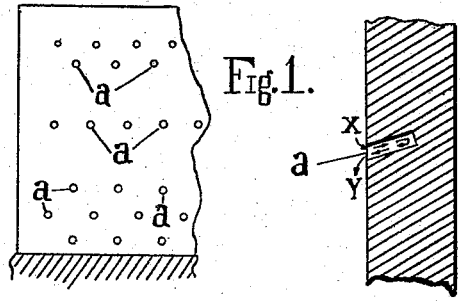
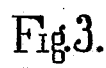
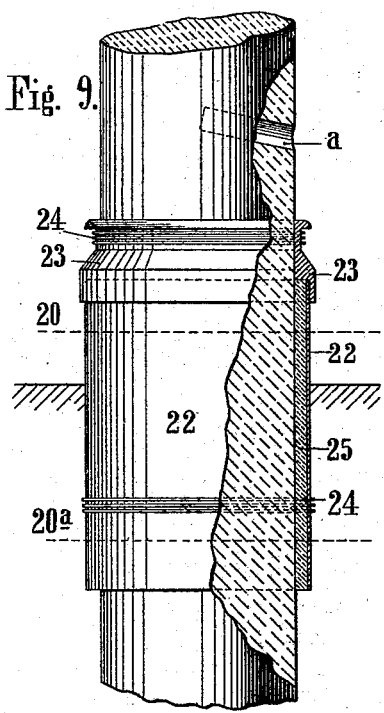
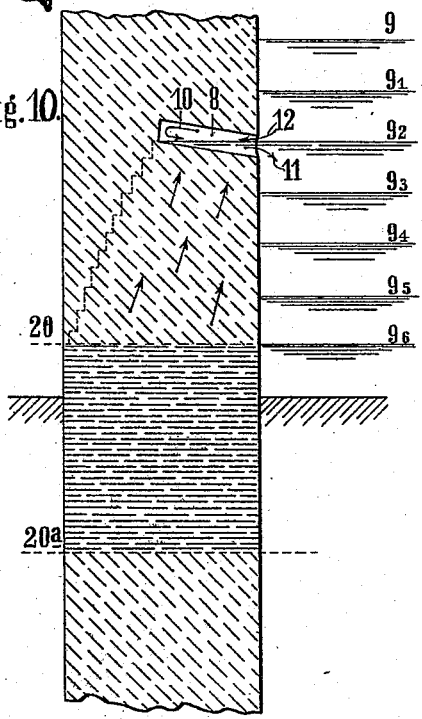
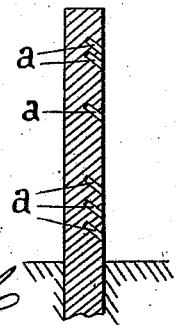
Witnesses:
E. O. Hildebrand
M. B. Taylor.
Inventor,
Achille Knapen
by Georgii & Massie
his Attorneys A. KNAPEN.
MEANS FOR DRYING STRUCTURAL PARTS.
APPLICATION FILED APR. 7, 1908.
915,969.
Patented Mar. 23, 1909.
2 SHEETS—SHEET 2.
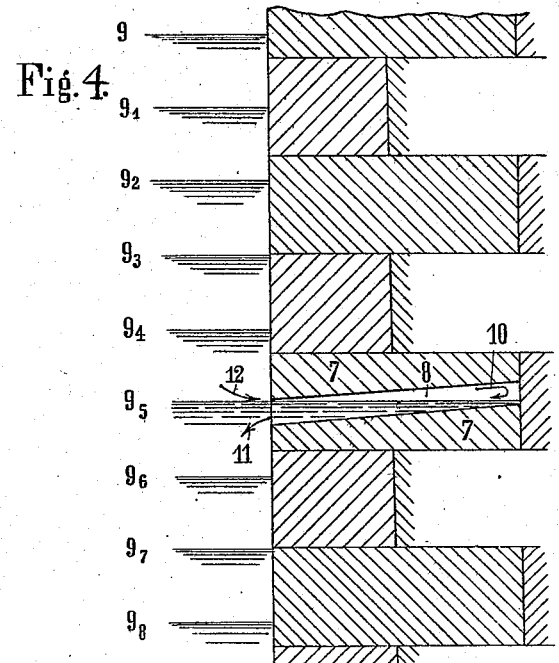
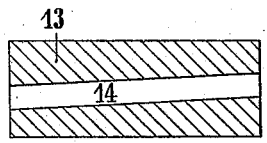
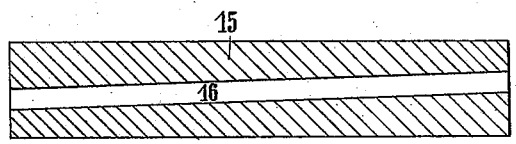
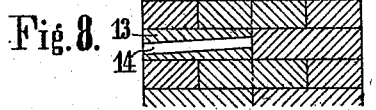
Witnesses:
E. O. Hildebrand
M. B. Taylor.
Inventor:
Achille Knapen
by Georgii & Massie
his Attorneys.

UNITED STATES PATENT OFFICE.

ACHILLE KNAPEN, OF BRUSSELS, BELGIUM.

MEANS FOR DRYING STRUCTURAL PARTS.

No. 915,969.  Specification of Letters Patent.  Patented March 23, 1909.

Application filed April 7, 1908. Serial No. 425,735.

*To all whom it may concern:*

Be it known that I, ACHILLE KNAPEN, a subject of the King of Belgium, residing at Brussels, in the Kingdom of Belgium, have invented new and useful Means for Drying Structural Parts, of which the following is a specification.

My invention relates to means for drying exposed structural parts of building structures such as walls, pillars, posts, piles and the like of stone, wood or other moisture absorbing materials and for keeping them dry. The means consist in a plurality of inclined air channels or cavities preferably in the form of cylindrical holes in the external surface of the structural parts, which cylindrical holes descend outwardly and are closed at their internal ends, so that they form a special sort of siphons and produce a constant circulation of air for gradually drying the structural parts and keeping them dry. In case the exposed structural parts are of wood, in addition to the inclined cylindrical holes mantles or covers of water- and air-tight materials and fillings of porous materials are employed for protecting the endangered zone in and above the ground.

I will now proceed to describe my invention with reference to the accompanying drawings, in which—

Figure 1 is an elevation of the external side of an exposed structural part of stone, brickwork, etc. and provided with the inclined cylindrical holes, Fig. 2 is a vertical cross section through the same, Fig. 3 is a portion out of Fig. 2 on an enlarged scale and shows an inclined cylindrical hole, Fig. 4 is a vertical cross section on a larger scale through the external side of a wall of brickwork, Fig. 5 is a vertical longitudinal section through an ordinary brick provided with a longitudinal cylindrical channel, Fig. 6 is a vertical section through a dressed ashlar provided with a longitudinal cylindrical channel, Fig. 7 is a vertical longitudinal section through two bricks like Fig. 6 placed tandem and so disposed as to form an uninterrupted channel, Fig. 8 is a vertical cross section through a wall of brickwork and will be referred to later on, Fig. 9 is an elevation (partly in section) of part of an exposed wooden pillar, the lower end of which is embedded in the ground and is protected by a mantle with filling, and Fig. 10 is a vertical cross section through the same without mantle and filling, and will be referred to later on.

Similar characters of reference refer to similar parts throughout the several views.

In exposed structural parts of stone, brickwork, or other moisture absorbing materials the interior is frequently from the beginning moist or it absorbs moisture, which may come from various sources. For example rain may form one source, the underground water may form another source, this subterraneous water being sucked upward by capillary attraction, or chemical processes, such as hardening of mortar etc., may form a third source, the water being liberated in the interior during the process, or water added to mortar and introduced into the interior during building may form a fourth source, or in case of structural parts of wood the sap contained in the interior may form a fifth source, or the hygroscopic moisture of the atmosphere may form a sixth source, this moisture (*i. e.* steam or fog) condensing from the air during variations of the temperature and penetrating into the interior of the structural part. The moisture from any source whatever will produce defects of various kinds. For example the moisture in external walls of buildings serving as abodes for human beings or as stables for animals will produce effects which are injurious to health. Or if the external sides of a building are covered with paintings *al fresco*, the moisture will gradually destroy these paintings. In wet walls organisms will settle and produce effects (such as rot or decay), whereby the strength of the brickwork is gradually destroyed. Free-standing pillars of wood exposed alternately to the influences of dryness and moisture will become cracked and rapidly destroyed.

As manifold as the sources and the evil effects of the moisture are the means which have hitherto been devised for avoiding or remedying the said defects. Such means or remedies may be classified in two groups which are both faulty in one respect or the other. Means such as copes or shelves of slate, or sheet zinc, sheet tin, sheet lead, or impregnated paper, or tarred pasteboard, or glass, etc., or embedded water absorbing bodies etc. will prove effective only for a short time or at the most for a few years, so that at comparatively short intervals expensive artificial drainings of the brickwork become necessary. Other means, such as air channels open at both ends in the brickwork are certainly permanently effective but they produce drafts of air which are objectionable as regards the habitability and heating of the building, or they cannot be employed for other reasons, for example that they interfere with fresco painting of the walls and that they excessively weaken the supporting walls. All these defects are according to my invention avoided by providing the structural parts to be dried or kept dry on their external surfaces with inclined cylindrical holes, which descend outwardly and are closed at their upper ends, while at their lower ends they communicate with the atmosphere. Thereby for walls the advantage is obtained, that the other side need not be broken or perforated. Moreover both for stone structures and for wooden structures the advantage is gained, that the inevitable weakening caused by the said holes is but insignificant, at any rate it is far less than the weakening produced by the evil effects of permanent moisture.

Fig. 1 illustrates for example the external side of a wall provided with several superposed horizontal rows of inclined cylindrical holes $a$ $a$, the holes $a$ $a$ in any one row alternating with those of the next row above or below. The distance between any two holes $a$ $a$ may be for example one meter in the vertical and horizontal direction. Obviously it does not matter, whether the holes $a$ $a$ are disposed in vertical or slanting rows.

Fig. 2 clearly shows the inclination of the several holes $a$ $a$. The angle of inclination, the diameter and the length of the cylindrical holes may be varied according to the porosity of the materials and to other circumstances. For example in a wall of a thickness of 64 centimeters the length of the holes $a$ may be 32 centimeters and their diameter 3 centimeters.

Fig. 3 shows a cylindrical hole $a$ on a larger scale, in which the direction of the circulating air is indicated by arrows $x$ and $y$.

The circulation of air will take place in the inclined cylindrical hole $a$ in Fig. 3 by reason of the difference in specific weight of the air, the slightly warmer and comparatively drier air entering the cylindrical hole $a$ in the direction of the arrows $x$ and the slightly colder air containing moisture will flow off in the direction of the arrows $y$. The entering air has the same degree of humidity and temperature as the air in the open, say for example 70% of humidity and a temperature of 15° centigrade. Within the cylindrical hole $a$ the air will stay a sufficiently long time for charging itself completely with moisture. The water in the hole $a$ changing from its liquid state to the gaseous state requires for its evaporation a certain amount of heat which is extracted partly from the entering air and partly from the interior of the structure, so that within the hole $a$ a lower temperature will prevail than in the atmosphere and on the external surface of the structure. By this cooling the air will become heavier, so that it sinks downward and flows off slowly along the bottom side of the hole $a$, while fresh dry warm air will enter from without. In the above cited example the escaping air might have 100% of humidity and a temperature of 12° centigrade. The escaping air will carry off not only the evaporated moisture but also a further slight quantity of moisture in the shape of fog which loads the lower current of air. Thereby the draining of the structure is accelerated. For this reason it is proper to consider the inclined cylindrical holes $a$ $a$ to be "single-legged siphons".

In the described manner a certain amount of moisture is extracted from the interior of the structural part, although extremely slowly, yet continuously, hour after hour, day after day, in summer and in winter, until at last an equalization between the atmosphere and the interior of the structural part or wall is obtained as regards the temperature and the degree of humidity. It may be stated approximately, that a "single-legged siphon" of the size mentioned above will completely saturate one cubic meter of air from the atmosphere with moisture within about 2½ hours. The drying of the structural part is by no means limited to the immediate neighborhood of each "single-legged siphon", since the moisture contained in the interior will be perpetually distributed by the capillary attraction, so that continuously a fresh amount of moisture will be transmitted to each "single-legged siphon" to be herein evaporated and discharged at the exterior. When already existing structural parts are to be dried according to my method, "single-legged siphons" will have to be cut into them. If it is desired to rapidly dry a wall about to be built up and to keep it dry, it is preferable to embed in the wall porous blocks such as bricks 13 having each an inclined longitudinal channel 14 (see Fig. 6) or porous dressed ashlars 15 having an inclined longitudinal bore 16 (see Fig. 7), as is for example shown in Fig. 9. In case a wall is to be made of brickwork and is thicker than two brick lengths, a long channel 19 may be formed by two bricks 17 and 18 (like 13 in Fig. 6), these bricks being placed tandem and on different heights, as is clearly shown at Fig. 8.

In Fig. 5 the horizontal lines 9, $9_1$, $9_2$, $9_3$, . . . $9_8$ are assumed to mark several superposed planes, in each of which the air has the same specific weight throughout. Then for example in the "single-legged siphon" $a$ in the brick 7 a layer of colder air will be formed in the lower part of the siphon, which layer will slowly escape in the direction of the arrow 11, while from the atmosphere a continuous current 8 of dry warmer air will enter the siphon *a* at the top of its mouth in the direction of the arrow 12 and pass along the upper inside until it changes its direction according to the arrow 10 and proceeds downward along the lower inside while charging itself with moisture. As Fig. 9 on a reduced scale shows, the "single-legged siphon" 14 extends only to the middle plane 21 of the wall.

Figs. 10 and 11 illustrate the application of the invention to a structural part of wood, in this case a wooden pillar. As is well known, wood will last extremely long if it is kept dry, or if it is kept lying in water, but the wood is quickly destroyed, if it is exposed alternately to the action of dryness and that of moisture, or if a part of the wood projects into the atmosphere, and another part of it is in permanently moist ground. If the part of the wood projecting into the atmosphere is protected from rain, for example by a roof, there will be an endangered zone of the wood between the permanently dry upper part and the permanently moist lower part, as is indicated by the horizontal hatching in Fig. 11. When this endangered zone is left unprotected, a current of moisture will constantly rise and gradually evaporate while leaving behind in the pores of the wood the dissolved ground salts. The deposits so formed will gradually block up the pores of the wood, and if the blocking up is complete, the further deposits will produce explosive forces which will be rendered visible by fissures. This defect is according to my invention avoided by providing a mantle 22, see Fig. 10, or other cover which surrounds the pillar or covers the other structural part at a convenient distance therefrom and extends upward to a convenient point above the upper level 20 of the endangered zone and downward to a convenient point beneath the lower level 20ª of the same zone for keeping off the moisture of the ground. The space between the pillar and the mantle 22 or between the structural part and the cover is then filled with a porous material, such as for example asbestos, which permits air to pass through and is a bad heat-conductor. The mantle 22 or other cover is made from a suitable water-and air-tight material and should be provided at the top with a convenient cap 23 or the like for preventing rain or other water from getting into the filling 25, also for keeping off in winter the frost from penetrating into the moist wood in the interior of the endangered zone.

If the mantle 22 and the cap 23 are made in portions or sections, the latter may be connected together by wire rings 24, 24, as is shown.

The means for protecting the endangered zone consisting in the mantle or cover 22, with the filling material, which means is illustrated in Figs. 10 and 11 is not herein claimed, since the same forms the subject matter of a divisional application to be filed.

I claim:

1. A permanently placed building structure having channels formed therein, said channels inclined downwardly and outwardly and open to the atmosphere and closed at their inner ends, whereby an air-drying of the structure is effected.

2. A structure containing absorbent blocks having channels formed therein, said blocks arranged with the channels inclined downwardly and outwardly and open to the atmosphere and closed at their inner ends, whereby an air-drying of the structure is effected.

3. A structure containing exterior blocks having downwardly and outwardly inclined perforations extending therethrough, and interior blocks arranged to close the upper inner ends of the perforations in the exterior blocks, whereby an air-drying of the structure is effected.

4. A structure comprising imperforate blocks and blocks having perforations extending therethrough, a plurality of the perforate blocks being arranged in tandem with their perforations in register to form a longer channel inclined downwardly and outwardly, with the outer lower end of the channel open to the atmosphere and the inner upper end of the channel closed by an adjacent imperforate block, whereby an air-drying of the structure is effected.

5. A structure comprising imperforate blocks and blocks having perforations extending therethrough, a plurality of the perforate blocks being arranged in tandem with their perforations in register to form a longer channel extending at an inclination downwardly and outwardly from substantially the center of the structure to the atmosphere, with the inner end of said channel closed by an imperforate block, whereby an air-drying of the structure is effected.

In witness whereof I have hereunto set my hand in presence of two witnesses.

ACHILLE KNAPEN.

Witnesses:
C. J. CAUWE,
GREGORY SCHLEY.